US009248440B2

(12) United States Patent
Hirose et al.

(10) Patent No.: US 9,248,440 B2
(45) Date of Patent: Feb. 2, 2016

(54) HONEYCOMB STRUCTURE, HONEYCOMB CATALYST BODY USING THE SAME, AND MANUFACTURING METHOD OF HONEYCOMB STRUCTURE

(71) Applicant: NGK Insulators, Ltd., Nagoya (JP)

(72) Inventors: Shogo Hirose, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 233 days.

(21) Appl. No.: 13/803,874

(22) Filed: Mar. 14, 2013

(65) Prior Publication Data

US 2013/0243999 A1    Sep. 19, 2013

(30) Foreign Application Priority Data

Mar. 19, 2012  (JP) ................................. 2012-061673
Mar. 12, 2013  (JP) ................................. 2013-049662

(51) Int. Cl.

| | | |
|---|---|---|
| *B01J 23/02* | (2006.01) | |
| *B01J 32/00* | (2006.01) | |
| *B01J 29/80* | (2006.01) | |
| *C04B 38/00* | (2006.01) | |

(Continued)

(52) U.S. Cl.
CPC *B01J 32/00* (2013.01); *B01J 29/80* (2013.01); *C04B 38/007* (2013.01); *C04B 38/0009* (2013.01); *B01D 46/2429* (2013.01); *B01D 2046/2433* (2013.01); *C04B 2103/0051* (2013.01); *C04B 2111/00793* (2013.01); *Y10T 428/24149* (2015.01); *Y10T 428/24157* (2015.01)

(58) Field of Classification Search
CPC ....... B01J 32/00; B01J 29/80; C04B 38/0009; B01D 2046/2433; B01D 46/2429
USPC ................... 502/75, 439, 306, 252, 328, 324; 428/116, 117, 401
See application file for complete search history.

(56) References Cited

U.S. PATENT DOCUMENTS

| | | | |
|---|---|---|---|
| 2007/0048494 A1 | 3/2007 | Miyairi et al. | |
| 2009/0176053 A1 | 7/2009 | Miyairi et al. | |

(Continued)

FOREIGN PATENT DOCUMENTS

| | | |
|---|---|---|
| EP | 1 842 578 A2 | 10/2007 |
| EP | 1 946 840 A1 | 7/2008 |

(Continued)

OTHER PUBLICATIONS

Extended European Search Report dated Aug. 27, 2013.

*Primary Examiner* — Colleen Dunn
*Assistant Examiner* — Haytham Soliman
(74) *Attorney, Agent, or Firm* — Burr & Brown, PLLC (57) ABSTRACT

A honeycomb structure including porous partition walls, a porosity of the partition walls is from 45 to 70%, and when pores having the maximum width in excess of 10 μm in a cross section of each of the partition walls are large pores and the partition wall is equally divided into three regions of a center region and surface layer regions present on both sides of the center region, a total area of cross sections of the large pores which appear in the surface layer regions is from 60 to 100% of a total area of cross sections of all the pores which appear in the surface layer regions, and a total area of cross sections of the large pores which appear in the center region is from 0 to 40% of the total area of cross sections of all the pores which appear in the center region.

14 Claims, 5 Drawing Sheets

(51) Int. Cl.
*B01D 46/24* (2006.01)
*C04B 103/00* (2006.01)
*C04B 111/00* (2006.01)

(56) References Cited

U.S. PATENT DOCUMENTS

2012/0009093 A1* 1/2012 Mizutani et al. .............. 422/177
2012/0064286 A1* 3/2012 Hirose et al. .................. 428/116
2012/0317946 A1   12/2012 Miyairi

FOREIGN PATENT DOCUMENTS

| EP | 2 239 037 A1 | 10/2010 |
| EP | 2 412 419 A1 | 2/2012 |
| EP | 2 425 888 A1 | 3/2012 |
| EP | 2 505 252 A1 | 10/2012 |
| JP | 2009-154148 A1 | 7/2009 |

* cited by examiner

HONEYCOMB STRUCTURE, HONEYCOMB CATALYST BODY USING THE SAME, AND MANUFACTURING METHOD OF HONEYCOMB STRUCTURE

BACKGROUND OF HE INVENTION

1. Field of the Invention

The present invention relates to a honeycomb structure onto which a catalyst for purification of an exhaust gas is loaded, a honeycomb catalyst body using this honeycomb structure, and a manufacturing method of a honeycomb structure.

2. Description of Related Art

An exhaust gas discharged from an internal combustion engine such as an engine for a car includes harmful substances such as carbon monoxide (CO), hydrocarbon (HC), and nitrogen oxides ($NO_x$). When such harmful substances are decreased and the exhaust gas is purified, a catalyst reaction is broadly used. In this catalyst reaction, it is possible to realize generation of a harmless substance from a harmful substance such as carbon monoxide (CO) by simple means for bringing the exhaust gas into contact with a catalyst. Therefore, in the car or the like, the exhaust gas is usually purified by disposing the catalyst in the middle of an exhaust system of the exhaust gas from the engine.

To dispose the catalyst in the exhaust system of the car or the like, a honeycomb catalyst body is used in which the catalyst is loaded onto a honeycomb structure. In the honeycomb catalyst body, the honeycomb structure is formed by partition walls onto which the catalyst is loaded, and cells surrounded with the partition walls function as through channels of the exhaust gas. In such a honeycomb catalyst body, the exhaust gas is divided into small portions to flow into the plurality of cells, and in each cell, the divided small portion of the exhaust gas is brought into contact with the catalyst loaded onto the surface of the partition wall. Consequently, in the honeycomb catalyst body, by simultaneously treating the plurality of divided small portions of the exhaust gas, the exhaust gas can be treated with a high purification efficiency.

Furthermore, for the honeycomb catalyst body, a technology has been suggested in which a honeycomb structure is formed by porous partition walls having numerous pores, and a catalyst is also loaded onto inner wall surfaces of the pores of the partition walls (e.g., Patent Document 1). In this technology, the catalyst is loaded onto the inner wall surfaces of the pores to increase an amount of the catalyst to be loaded onto the honeycomb catalyst body. Furthermore, in this technology, an exhaust gas is allowed to flow into the pores of the partition walls to bring the exhaust gas into contact with the catalyst also in the pores, thereby further increasing a contact frequency between the exhaust gas and the catalyst.

RELATED-ART DOCUMENT

Patent Document

[Patent Document 1] JP-A-2009-154148

SUMMARY OF THE INVENTION

However, in the above-mentioned honeycomb catalyst body, it is possible to increase an amount of a catalyst to be loaded by loading the catalyst onto inner wall surfaces of pores, but the catalyst loaded onto the inner wall surfaces of the pores cannot effectively function sometimes. In the above-mentioned honeycomb catalyst body, the pores are closed with the catalyst or open frontal areas of the pores in surfaces of partition walls are narrowed. Therefore, in the above-mentioned honeycomb catalyst body, an exhaust gas cannot flow into the pores, and hence the catalyst loaded onto the inner wall surfaces of the pores cannot come in contact with the exhaust gas sometimes.

In view of the above problems, an object of the present invention is to provide a technology which can load a large amount of catalyst and which enables the loaded catalyst to effectively exert a catalyst action.

Means of Solving the Problems

According to the present invention, there are provided a honeycomb structure, a honeycomb catalyst body using this honeycomb structure, and a manufacturing method of a honeycomb structure as follows.

[1] A honeycomb structure including porous partition walls with which a plurality of cells are formed to become through channels of a fluid and which are provided with a plurality of pores, wherein a porosity of the partition walls is from 45 to 70%, and when the pores having the maximum width in excess of 10 µm in a cross section of each of the partition walls which is parallel to a thickness direction of the partition wall are large pores and when the partition wall is equally divided into three regions of a center region and surface layer regions present on both sides of the center region along the thickness direction, in cross sections of the surface layer regions of the partition wall which are parallel to the thickness direction, a total area of cross sections of the large pores which appear in the cross sections of the surface layer regions is from 60 to 100% of a total area of cross sections of all the pores which appear in the cross sections of the surface layer regions, and in a cross section of the center region of the partition wall which is parallel to the thickness direction, a total area of cross sections of the large pores which appear in the cross section of the center region is from 0 to 40% of the total area of cross sections of all the pores which appear in the cross section of the center region.

[2] The honeycomb structure according to the above [1], wherein in a cross section of each of the partition walls which is perpendicular to the thickness direction, a shape of a contour of each of the pores corresponding to 20 to 100% of all the pores is one of a substantially circular shape and a substantially elliptic shape.

[3] The honeycomb structure according to the above [1] or [2], wherein a permeability is from $1 \times 10^{-12}$ to $10 \times 10^{12}$ ($m^2$).

[4] The honeycomb structure according to any one of the above [1] to [3], wherein a cell density is from 7.75 to 46.5 cells/$cm^2$, and the partition walls have a porosity of 50 to 70% and an average pore diameter of 10 to 50 µm.

[5] A honeycomb catalyst body including the honeycomb structure according to any one of the above [1] to [4]; and a catalyst loaded onto the surfaces of the pores of the partition walls of the honeycomb structure.

[6] The honeycomb catalyst body according to the above [5], wherein the catalyst includes at least one of metal-substituted zeolite and vanadium, an amount of the catalyst to be loaded is from 100 to 300 g/L, and in the partition walls, a porosity (B) in a state where the catalyst is loaded to a porosity (A) before the catalyst is loaded is from 0.1 to 0.6 time.

[7] A manufacturing method of a honeycomb structure which obtains the honeycomb structure according to any one of the above [1] to [4], including: a kneaded material preparing step of mixing and kneading forming raw materials containing a ceramic raw material and a pore former having expansion/contraction properties to obtain a kneaded material; a forming step of extruding the kneaded material to obtain a formed honeycomb body having partition walls with which a plurality of cells are formed; and a firing step of firing the formed honeycomb body to obtain the honeycomb structure.

[8] The manufacturing method of the honeycomb structure according to the above [7], wherein the pore former has a plurality of projecting portions on the surface of the pore former.

According to a honeycomb structure, a honeycomb catalyst body using this honeycomb structure, and a manufacturing method of a honeycomb structure of the present invention, a large ratio of pores can be open in surfaces of partition walls, and have narrowed widths in center regions, so that it is possible to load a large amount of catalyst onto inner wall surfaces of the partition walls. Furthermore, according to the honeycomb structure, the honeycomb catalyst body using this honeycomb structure, and the manufacturing method of the honeycomb structure of the present invention, open frontal areas of the pores are not easily closed or narrowed by the catalyst, and hence when a gas is allowed to flow into the pores, a catalyst action in the pores can effectively be exerted.

DETAILED DESCRIPTION OF THE INVENTION

Hereinafter, embodiments of the present invention will be described with reference to the drawings. The present invention is not limited to the following embodiments, and changes, modifications and improvements can be added to the embodiments without departing from the gist of the present invention.

Figure 1:
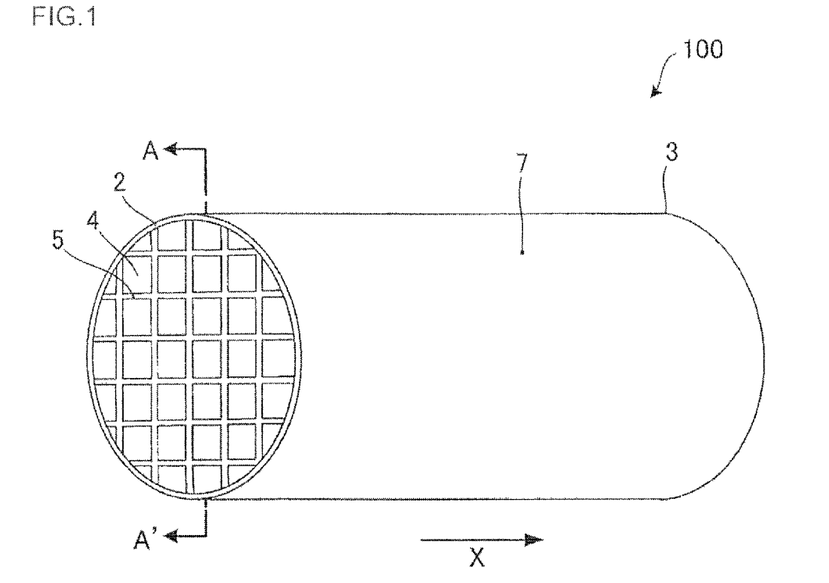
FIG. 1: is a perspective view schematically showing an embodiment of a honeycomb structure of the present invention.

1. Honeycomb Structure:

FIG. 1 is a perspective view schematically showing an embodiment of a honeycomb structure of the present invention. As shown in the drawing, a honeycomb structure 100 of the present embodiment includes a cylindrical outer peripheral wall 7, and porous partition walls 5 with which a plurality of cells 4 are formed in the outer peripheral wall 7. At both ends of the honeycomb structure 100 of the present embodiment in an axial direction X, the plurality of cells 4 are open, and end surfaces 2 and 3 are formed by an edge of the outer peripheral wall 7 and edges of the partition walls 5.

Figure 2:
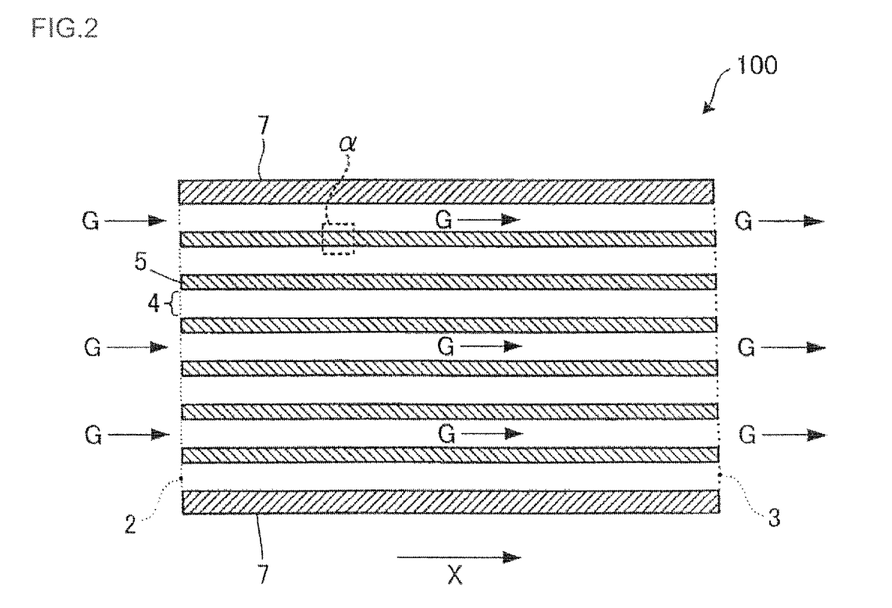
FIG. 2: is a schematic view of a cross section taken along the A-A' line of FIG. 1.

FIG. 2 is a schematic view of a cross section taken along the A-A' line of FIG. 1. As shown in the drawing, in the honeycomb structure 100 of the present embodiment, the plurality of cells 4 extend along the axial direction X, and these cells 4 can function as through channels of a fluid, respectively. For example, in the honeycomb structure 100 of the present embodiment, when a gas G is allowed to flow into the cells 4 from the one end surface 2 (a first end surface), the gas G can pass through the cells to the other end surface 3 (a second end surface) along the axial direction X, and can be discharged to the outside.

Figure 3:
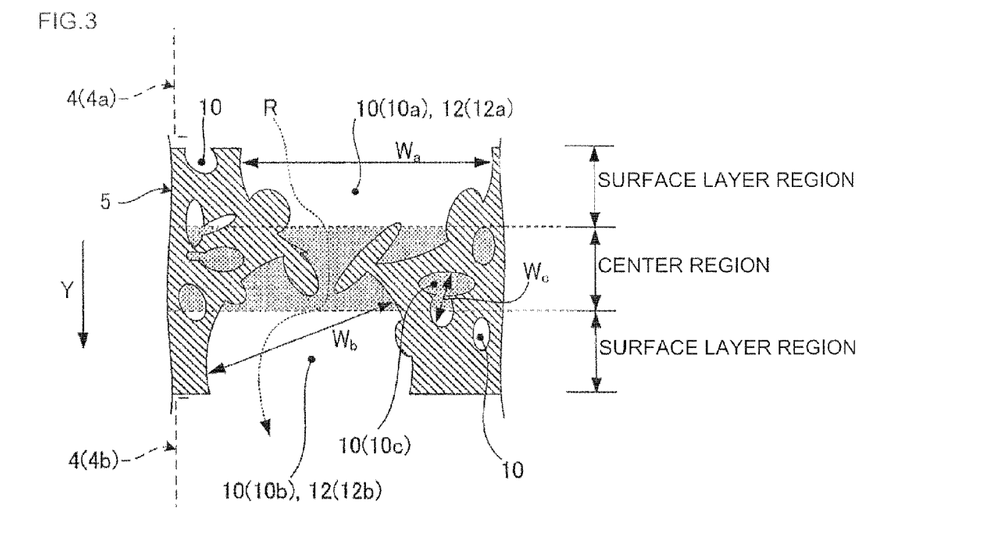
FIG. 3: is a cross sectional view schematically showing a partition wall in a frame a of FIG. 2.

FIG. 3 is a cross sectional view schematically showing the partition wall 5 in a frame a of FIG. 2. As shown in the drawing, since the partition wall 5 of the honeycomb structure 100 of the present embodiment is porous, a plurality of pores 10 are formed.

In the present description, the pores 10 having the maximum width in excess of 10 μm in the cross section of each of the partition walls 5 which is parallel to a thickness direction Y (e.g., the cross section shown in FIG. 3) of the partition wall 5 are large pores 12.

In the cross section of the partition wall 5 shown in FIG. 3, for example, a maximum width $W_a$ of a pore 10a and a maximum width $W_b$ of a pore 10b are 10 μm or more, and a maximum width $W_c$ of a pore 10c is smaller than 10 μm. Therefore, among the pores 10a to 10c, the pores 10a and 10b are classified as large pores 12a and 12b, respectively.

Additionally, for example, as in the large pore 12a and the large pore 12b shown in FIG. 3, the plurality of large pores 12 are connected to each other via the pore 10 having a width smaller than 10 μm in the cross section of the partition wall 5 sometimes. In this case, the connected large pores 12a and 12b are separately identified as one independent large pore 12, respectively. Moreover, the pore 10 connecting the large pores 12 to each other and having the width smaller than 10 μm is regarded as a part of the large pore 12. For example, a path R in FIG. 3 (shown by a dotted bold arrow) passes through large pore 12a from a cell 4a which faces one surface of the partition wall 5, and continuously passes through the large pore 12b to reach a cell 4b which faces a surface of the partition wall 5 on an opposite side. That is, the path R in FIG. 3 is constituted of the two large pores 12a and 12b.

In FIG. 3, in a cross section of the pore 10 which appears in the cross section of the partition wall 5, a cross section of the pore 10 which appears in a cross section of a center region of the partition wall 5 is shown by "hatching".

In the honeycomb structure 100 of the present embodiment, when the partition wall 5 is equally divided into three regions of the center region and surface layer regions present on both sides of the center region along the thickness direction Y, in cross sections of the surface layer regions of the partition wall 5 which are parallel to the thickness direction Y, a total area of cross sections of the large pores 12 which appear in the cross sections of the surface layer regions is from 60 to 100% of a total area of cross sections of all the pores 10 which appear in the cross sections of the surface layer regions, and in a cross section of the center region of the partition wall 5 which is parallel to the thickness direction Y, a total area of cross sections of the large pores 12 which appear in the cross section of the center region is from 0 to 40% of the total area of the cross sections of all the pores 10 which appear in the cross section of the center region.

As in the honeycomb structure 100 of the present embodiment, when the total area of the cross sections of the large pores 12 in the cross sections of the surface layer regions is from 60 to 100% of the total area of the cross sections of all the pores 10 in the cross sections of the surface layer regions and when the total area of the cross sections of the large pores 12 in the cross section of the center region is from 0 to 40% of the total area of the cross sections of all the pores 10 in the cross section of the center region, in the surface of the partition wall 5, a large ratio of the pores 10 are wide open, and in the center region of the partition wall 5, a large ratio of the pores 10 have a narrowed width. Furthermore, when the through channel extending through the partition wall 5 is formed by the pores 10 (e.g., the path R constituted of the large pores 12a and 12b shown in FIG. 3), the through channel has a decreased width in the center region of the partition wall 5.

Figure 5:
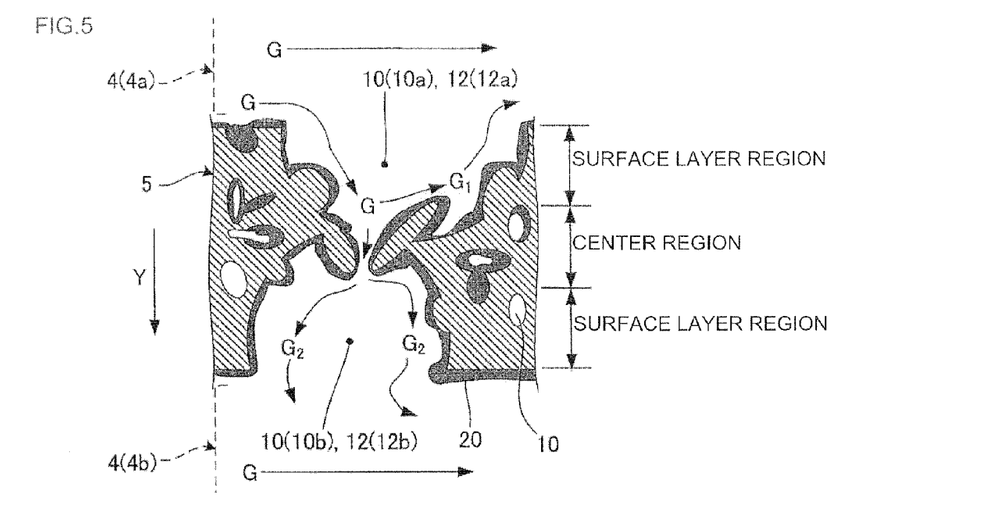
FIG. 5: is an explanatory view of a case where a catalyst is loaded onto the partition wall shown in FIG. 3 to purify an exhaust gas.

As a result, in the honeycomb structure 100 of the present embodiment, the catalyst easily permeates the pores 10 of the surface layer regions of the partition wall 5 in a step of loading the catalyst. Additionally, in the honeycomb structure 100 of the present embodiment, the catalyst which has permeated the pores 10 of the surface layer regions also easily permeates the pores 10 of the center region of the partition wall 5. Moreover, in the honeycomb structure 100 of the present embodiment, since the width of the pore 10 of the center region of the partition wall 5 decreases, it is possible to suitably hold the catalyst which has permeated the center region of the partition wall 5. Therefore, according to the honeycomb structure 100 of the present embodiment, as shown in FIG. 5, it becomes easy to uniformly load the catalyst onto the surfaces of the pores 10 of the surface layer region and the surfaces of the pores 10 of the center region of the partition wall 5 (explanation of FIG. 5 will be described later).

Moreover, as in the honeycomb structure 100 of the present embodiment, when the total area of the cross sections of the large pores 12 in the cross sections of the surface layer regions is from 60 to 100% of the total area of the cross sections of all the pores 10 in the cross sections of the surface layer regions and when the total area of the cross sections of the large pores 12 in the cross section of the center region is from 0 to 40% of the total area of the cross sections of all the pores 10 in the cross section of the center region, a sufficient strength is kept in the center region of the partition wall 5. That is, in the honeycomb structure 100 of the present embodiment, the strength of the partition walls 5 can be maintained, even when the partition walls 5 have a high porosity.

Furthermore, in the honeycomb structure 100 of the present embodiment, in the cross sections of the surface layer regions of each of the partition walls 5 which are parallel to the thickness direction Y, the total area of the cross sections of the large pores 12 which appear in the cross sections of the surface layer regions is preferably from 60 to 90% of the total area of the cross sections of all the pores 10 which appear in the cross sections of the surface layer regions. Moreover, in the cross section of the center region of the partition wall 5 which is parallel to the thickness direction Y, the total area of the cross sections of the large pores 12 which appear in the cross section of the center region is preferably from 10 to 40% of the total area of the cross sections of all the pores 10 which appear in the cross section of the center region. In particular, the total area of the cross sections of the large pores 12 which appear in the cross sections of the surface layer regions is further preferably from 70 to 80% of the total area of the cross sections of all the pores 10 which appear in the cross sections of the surface layer regions. Moreover, the total area of the cross sections of the large pores 12 which appear in the cross section of the center region is further preferably from 20 to 30% of the total area of the cross sections of all the pores 10 which appear in the cross section of the center region.

Figure 4:
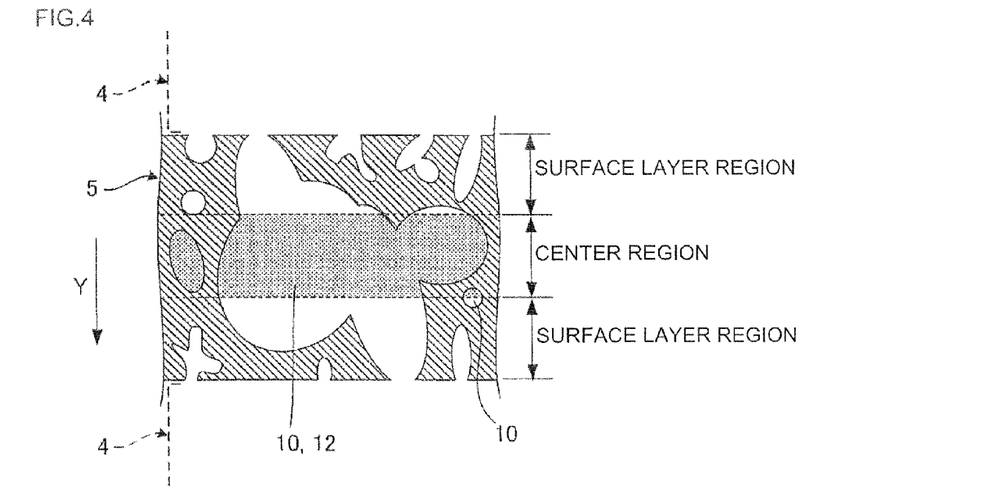
FIG. 4: is a cross sectional view schematically showing a partition wall of a conventional honeycomb structure.

On the other hand, FIG. 4 schematically shows a cross sectional view of a partition wall of a conventional honeycomb structure. In FIG. 4, in cross sections of pores 10 which appear in a cross section of a partition wall 5, cross sections of the pores 10 which appear in a cross section of a center region of the partition wall 5 are shown by "hatching". In the porous partition wall 5 of such a conventional honeycomb structure, more large pores 12 are present in the center region than in surface layer regions of the partition wall 5, or the large pores are uniformly present in the surface layer regions and the center region. Therefore, as shown in the drawing, in the conventional honeycomb structure, a ratio of the pores 10 which are wide open in the surface of the partition wall 5 decreases, as compared with the honeycomb structure 100 of the present embodiment described above. Consequently, in the conventional honeycomb structure, a catalyst does not easily permeate the pores 10 of the center region of the partition wall 5 in a step of loading the catalyst (see FIG. 6).

In the honeycomb structure 100 of the present embodiment, a porosity of the partition walls 5 is from 45 to 70%. Additionally, the porosity of the partition walls mentioned in the present description is a value measured by a mercury porosimeter. In the honeycomb structure 100 of the present embodiment, when the porosity of the partition walls 5 is from 45 to 70%, it is advantageous that an amount of the catalyst to be loaded is suitably increased while keeping the strength of the partition walls at a predetermined strength or more.

Furthermore, in the honeycomb structure 100 of the present embodiment, the porosity of the partition walls 5 is preferably from 50 to 65%, and further preferably from 50 to 60%.

In the honeycomb structure 100 of the present embodiment, in the cross section of each of the partition walls 5 which is perpendicular to the thickness direction Y, a shape of a contour of each of the pores 10 corresponding to 20 to 100% of all the pores 10 is preferably one of a substantially circular shape and a substantially elliptic shape. When the pores 10 of cross-sectional shapes having the substantially circular and elliptic contours are present at the above ratio, the loading of the catalyst onto the partition walls 5 enhances. It is to be noted that in the present description, "the shape of the contour of the pore 10 is substantially circular" means that the shape is a circular shape, or can be approximated to the circular shape when the whole contour of the cross section of one pore is seen even in a case where the contour has a corrugated shape. Moreover, in the present description, when the shape of the contour of the pore 10 is substantially elliptic, it is meant that the shape is an elliptic shape, or can be approximated to the elliptic shape when the whole contour of the cross section of the one pore is seen even in a case where the contour has the corrugated shape.

Moreover, in the honeycomb structure 100 of the present embodiment, from the viewpoint of enhancement of communication properties and the catalyst loading, a permeability is preferably from $1 \times 10^{-12}$ to $10 \times 10^{-12}$ ($m^2$). This permeability is an index of a passing resistance when the gas is allowed to pass through the honeycomb structure 100.

As Darcy's law, the following equation is usually present. $\Delta P/L = 1/k \times \mu \times u$, in which $\Delta P[Pa]$: a pressure loss at air penetration, $L[m]$: a sample thickness, $\mu[Pa \cdot s]$: an air viscosity at 25° C., a viscosity of $18.35^{-6}$ at 1 atm, and $u[m/s]$: a fluid speed. A penetration coefficient $k$ [$m^2$] at this time is defined as the permeability.

In the honeycomb structure 100 of the present embodiment, there is not any special restriction on a thickness of each of the partition walls 5, but the thickness is preferably from 0.060 to 0.288 mm, further preferably from 0.108 to 0.240 mm, and especially preferably from 0.132 to 0.192 mm. According to such a constitution, it is possible to obtain the honeycomb structure 100 having a high strength and a decreased pressure loss.

"The thickness of each of the partition walls" mentioned in the present description means the thickness of a wall (the partition wall 5) with which two adjacent cells 4 are formed, in the cross section of the honeycomb structure 100 which is taken perpendicularly to an extending direction of the cells 4 (the X-direction). "The thickness of each of the partition walls" can be measured by, for example, an image analysis device (trade name "NEXIV, VMR-1515" manufactured by Nikon Co.).

In the honeycomb structure 100 of the present embodiment, there is not any special restriction on a cell density, but the cell density is preferably from 15 to 140 cells/cm$^2$, further preferably from 31 to 116 cells/cm$^2$, and especially preferably from 46 to 93 cells/cm$^2$. According to such a constitution, the increase of the pressure loss can be suppressed while maintaining the strength of the honeycomb structure 100.

"The cell density" mentioned in the present description is the number of the cells per unit area in the cross section taken perpendicularly to the cell extending direction.

In the honeycomb structure 100 of the present embodiment, it is preferable that the cell density is from 7.75 to 46.5 cells/cm$^2$ and that the partition walls 5 have a porosity of 50 to 70% and an average pore diameter of 10 to 50 μm. When all the above-mentioned conditions of the cell density, porosity and average pore diameter are satisfied, a significant catalyst action can be exerted by using the catalyst including metal-substituted zeolite or vanadium. Specifically, when there is used the catalyst including metal-substituted zeolite or vanadium which develops a quantity-dependent catalyst action, the quantity-dependent catalyst action can sufficiently be developed by loading a large amount of catalyst onto the partition walls 5. Additionally, it is possible to suppress peel of the catalyst including metal-substituted zeolite or vanadium from the partition walls 5.

In the conventional honeycomb structure, when the cell density is from 7.75 to 46.5 cells/cm$^2$ and a large amount of catalyst is loaded onto the partition walls, most of the catalyst is deposited on the partition wall surfaces, so that the catalyst easily peels. In particular, when the catalyst includes metal-substituted zeolite, the catalyst becomes bulky, and hence there is a strong tendency for the catalyst to be deposited on the surfaces of the partition walls. Moreover, when the catalyst is deposited on the surfaces of the partition walls, the catalyst peel from the partition walls further easily occurs. According to the honeycomb structure 100 of the present embodiment, as described above, the large ratio of the pores 10 are open in the surface of each of the partition walls 5, and the large ratio of the pores 10 have a narrowed width in the center region of the partition wall. As a result, according to the honeycomb structure 100 of the present embodiment, even when the large amount of the catalyst is loaded on the condition that the cell density is from 7.75 to 46.5 cells/cm$^2$, the catalyst peel from the partition walls does not easily occur. Moreover, in the honeycomb structure 100 of the present embodiment, even when the bulky catalyst including metal-substituted zeolite is used, it is possible to sufficiently suppress the catalyst peel from the partition walls.

In the honeycomb structure 100 of the present embodiment, the partition walls 5 preferably contain a ceramic material as a main component. Specifically, the material of the partition walls 5 is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When cordierite is used as the material of the partition walls 5, it is possible to obtain the honeycomb structure having a small coefficient of thermal expansion and an excellent resistance to heat shock. Additionally, when it is mentioned in the present description that "the partition walls contain the ceramic material as the main component", it is meant that the whole material of the partition walls contains 50 mass % or more of the ceramic material.

In the honeycomb structure 100 of the present embodiment, there is not any special restriction on a cell shape when the cross section perpendicular to the axial direction X is seen, but examples of the shape include a quadrangular shape shown in FIG. 1, and additionally, polygonal shapes such as a triangular shape and a hexagonal shape, a circular shape, and an elliptic shape.

In the honeycomb structure 100 of the present embodiment, there is not any special restriction on a thickness of the outer peripheral wall 7, but the thickness is preferably from 0.2 to 4.0 mm. When the thickness of the outer peripheral wall 7 is in the above range, at the flowing of a fluid (e.g., the exhaust gas) through the cells 4, the increase of the pressure loss can be prevented while suitably maintaining the strength of the honeycomb structure 100.

In the honeycomb structure 100 of the present embodiment, a material of the outer peripheral wall 7 is preferably the same as that of the partition walls 5, but may be different from that of the partition walls.

In the honeycomb structure 100 of the present embodiment, there is not any special restriction on a shape of the outer peripheral wall 7, but the shape may be a cylindrical shape shown in FIG. 1, or may be a tubular shape in which a bottom surface is elliptic, a tubular shape in which the bottom surface has a polygonal shape such as a quadrangular, pentangular or hexagonal shape, or the like.

In the honeycomb structure 100 of the present embodiment, there is not any special restriction on a size of the honeycomb structure 100, but a length of the honeycomb structure in the axial direction X is preferably from 50 to 300 mm. Moreover, when an outer shape of the honeycomb structure 100 is, for example, a cylindrical shape, a diameter of the bottom surface of the structure is preferably from 110 to 350 mm.

2. Honeycomb Catalyst Body:

The honeycomb catalyst body of the present invention includes the above-mentioned honeycomb structure of the present invention (e.g., "the honeycomb structure 100 of the present embodiment" described in the above paragraphs of "1. Honeycomb Structure"), and a catalyst loaded onto the surfaces of the pores of the partition walls of this honeycomb structure.

FIG. 5 is an explanatory view showing an embodiment of the honeycomb catalyst body of the present invention. More specifically, FIG. 5 is an explanatory view of a case where a catalyst 20 is loaded onto the partition wall 5 shown in FIG. 3 to purify the exhaust gas G. When the catalyst 20 is loaded onto the partition walls 5 in the honeycomb structure 100 described above, a ratio of the pores 10 having inner wall surfaces on which the catalyst 20 is uniformly loaded increases in all of the surface layer regions and center region of each of the partition walls 5. That is, a large amount of the catalyst 20 can be loaded onto the inner wall surfaces of the pores of the partition walls 5 in the honeycomb catalyst body of the present invention.

In the honeycomb catalyst body of the present embodiment, a layer of the catalyst 20 is formed on the inner wall surfaces of the pores 10. Furthermore, in the honeycomb catalyst body of the present embodiment, the honeycomb structure 100 described above is used, and hence in the pores 10, even when the catalyst 20 is loaded onto the inner wall surfaces of the pores 10, there is still a tendency to increase a ratio of the pores 10 into which the gas G can flow. Therefore, as shown in FIG. 5, in the honeycomb catalyst body of the present embodiment, the gas G can permeate the partition wall 5 through the pores 10, and the gas G can be purified by the catalyst 20 loaded onto the inner wall surfaces of the pores 10. Consequently, in the honeycomb catalyst body of the present embodiment, it is possible to purify the gas G in the pores, and hence a purification efficiency enhances as compared with a conventional honeycomb catalyst body.

Moreover, as shown in the drawing, in the honeycomb catalyst body of the present embodiment, a large ratio of the pores 10 have a tendency to be wide open in the surface of the partition wall 5, whereas a large ratio of the pores 10 have a narrowed width in the center region of the partition wall 5. According to such a shape of the pores 10, the gas G can easily flow into the pores 10 from the cell 4a. Furthermore, when the gas G reaches the center region of the partition wall 5, it is also easy to return the gas to the same cell 4a as in a gas $G_1$ shown in FIG. 5. Needless to say, in the process of allowing the gas G to reach the center region of the partition wall 5 and returning the gas to the cell 4a again, the gas G can be purified by the catalyst 20 loaded onto the inner wall surfaces of the pores 10.

Furthermore, in the honeycomb catalyst body of the present embodiment, even when the catalyst 20 is loaded, the pore 10 still extends through the partition wall 5. In this case, when the gas G reaches the center region of the partition wall 5, the gas is easily discharged to the adjacent cell 4b as in a gas $G_2$ shown in FIG. 5.

Therefore, in the honeycomb catalyst body of the present embodiment, not only the catalyst 20 loaded onto the inner wall surfaces of the pores 10 in the surface layer regions of the partition wall 5 but also the catalyst 20 loaded onto the inner wall surfaces of the pores 10 in the center region of the partition wall 5 can efficiently be utilized for the purification of the gas G.

Figure 6:
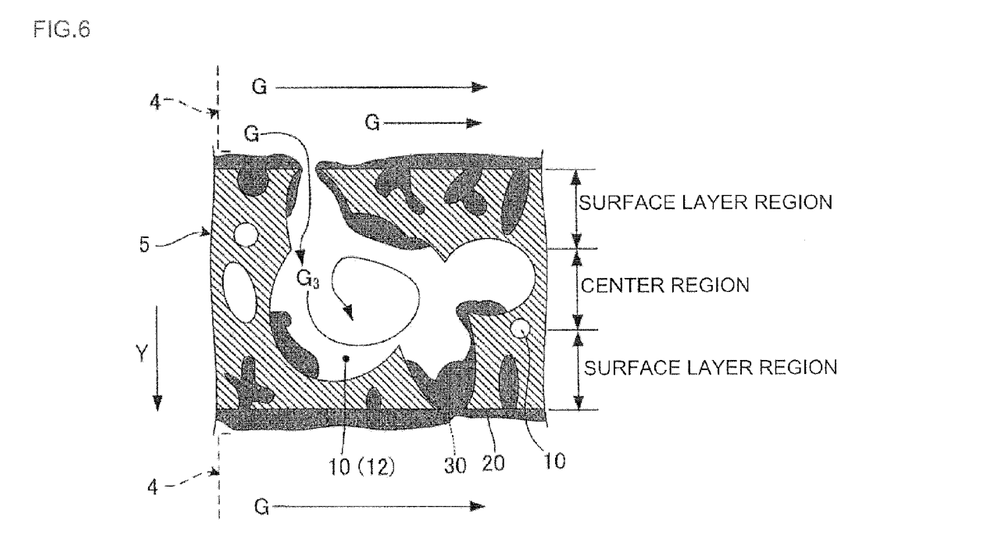
FIG. 6: is an explanatory view of a case where a catalyst is loaded onto the partition wall shown in FIG. 4 to purify an exhaust gas.

On the other hand, FIG. 6 is an explanatory view of a case where the catalyst 20 is loaded onto the conventional partition wall 5 shown in FIG. 4 to purify the exhaust gas G. According to the conventional honeycomb structure, in the step of loading the catalyst, it is not easy to allow the catalyst to permeate the pores 10 of the center region of the partition wall 5. Therefore, as shown in FIG. 6, a ratio of the pores 10 onto which the catalyst 20 is loaded has a tendency to decrease in the center region of the partition wall 5, as compared with the honeycomb catalyst body of the present invention (e.g., the embodiment is shown in FIG. 5).

Moreover, in the conventional honeycomb catalyst body, the ratio of the pores 10 which are wide open in the surface of the partition wall 5 is small, and hence as in a gas $G_3$ shown in FIG. 6, the gas $G_3$ which has flowed into the center region of the partition wall 5 does not have a tendency to easily return to the cell 4 again. Therefore, in the conventional honeycomb catalyst body, it is difficult to efficiently utilize the catalyst 20 loaded onto the center region of the partition wall 5 in purifying the gas G, as compared with the above-mentioned honeycomb catalyst body of the embodiment of the present invention.

In the honeycomb catalyst body of the present invention, when the gas is allowed to flow into the cells 4 from the inflow-side end surface 2 (the one end surface), the gas can be purified by the catalyst 20 loaded onto the partition walls 5, and finally the purified gas can be discharged from the outflow-side end surface 3 (the other end surface). Specifically, harmful substances such as carbon monoxide (CO), hydrocarbon (HC) and nitrogen oxides ($NO_x$) included in the gas can be purified by the catalyst loaded onto the partition walls.

In particular, the honeycomb catalyst body of the present invention is suitably used in purifying the exhaust gas. The exhaust gas mentioned in the present description is the exhaust gas discharged from a stationary engine for a car, a construction machine or an industrial purpose, a combustion apparatus, or the like. The exhaust gases from such various engines and the combustion apparatus include a large amount of harmful substances such as carbon monoxide (CO), hydrocarbon (HC) and nitrogen oxides ($NO_x$) sometimes. According to the honeycomb catalyst body of the present invention, it is possible to efficiently purify the harmful substances included in the exhaust gases from such various engines and the combustion apparatus.

In the honeycomb catalyst body of the present invention, a filling ratio of the catalyst is preferably from 50 to 90%, further preferably from 60 to 80%, and especially preferably from 65 to 75%. When the filling ratio of the catalyst is in the above range, there are the advantages that a contact efficiency between the catalyst and the gas enhances and that drop of a purification ratio can be suppressed. Moreover, the increase of the pressure loss at the inflow of the gas into the honeycomb catalyst body can be prevented. When the filling ratio of the catalyst is not less than a lower limit value, the increase of the pressure loss at the inflow of the gas can prevented. When the filling ratio of the catalyst is not more than an upper limit value, there are the advantages that the catalyst efficiently comes in contact with the gas and that the drop of the purification ratio can be suppressed. It is to be noted that the filling ratio of the catalyst mentioned in the present description means "a catalyst filling volume/a pore volume".

In the honeycomb catalyst body of the present invention, the catalyst can suitably be determined in accordance with a purpose. Examples of the catalyst include a ternary catalyst, an oxidation catalyst, an $NO_x$ selective reduction catalyst, and an $NO_x$ adsorber reduction catalyst. An amount of the catalyst to be loaded per unit volume of the honeycomb catalyst body is preferably from 100 to 300 g/liter, and further preferably from 150 to 250 g/liter (additionally, L is liter).

The ternary catalyst is the catalyst which mainly purifies hydrocarbon (HC), carbon monoxide (CO), and nitrogen oxides ($NO_x$). An example of the catalyst is a catalyst including platinum (Pt), palladium (Pd), and rhodium (Rh).

An example of the oxidation catalyst is a catalyst containing a noble metal. Specifically, the catalyst preferably contains at least one selected from the group consisting of platinum, palladium, and rhodium.

An example of the $NO_x$ selective reduction catalyst is a catalyst containing at least one selected from the group consisting of metal-substituted zeolite, vanadium, titania, tungsten oxide, silver, and alumina.

In the honeycomb catalyst body of the present invention, when the catalyst includes at least one of metal-substituted zeolite and vanadium, from the viewpoint that a contact frequency between the catalyst and the gas is sufficiently increased to enhance the purification efficiency, an amount of the catalyst to be loaded is preferably from 100 to 300 g/L, and on the partition walls, a porosity (B) in a state where the catalyst is loaded to a porosity (A) before the catalyst is loaded is preferably from 0.1 to 0.6 time [in other words, the porosity (B)/the porosity (A)=0.1 to 0.6].

Furthermore, in the honeycomb catalyst body of the present invention, when the catalyst includes at least one of metal-substituted zeolite and vanadium, the amount of the catalyst to be loaded is preferably from 100 to 300 g/L, the partition walls preferably have a porosity of 50 to 70% and an average pore diameter of 10 to 50 μm, the porosity (B) in the state where the catalyst is loaded to the porosity (A) before the catalyst is loaded is preferably from 0.1 to 0.6 time, and the cell density is preferably from 7.75 to 46.5 cells/cm$^2$ (50 to 300 cpsi). When all the above conditions of the amount of the catalyst to be loaded, the value of the porosity (B)/the porosity (A) and the cell density are satisfied, the contact frequency between the catalyst and the gas can sufficiently be increased to enhance the purification efficiency, and it is possible to suppress the increase of the pressure loss and the catalyst peel from the partition walls.

Examples of the NO$_x$ adsorber reduction catalyst include an alkali metal and/or an alkali earth metal. Examples of the alkali metal include potassium, sodium, and lithium. An example of the alkali earth metal is calcium.

3. Manufacturing Method of Honeycomb Structure:

The honeycomb structure of the present invention can be obtained by, for example, the following manufacturing method (the manufacturing method of the honeycomb structure of the present invention). The manufacturing method of the honeycomb structure of the present invention includes a kneaded material preparing step, a forming step and a firing step. The kneaded material preparing step is the step of mixing and kneading forming raw materials containing a ceramic raw material and a pore former to obtain a kneaded material. The forming step is the step of extruding the kneaded material obtained by the kneaded material preparing step into a honeycomb shape, to obtain a formed honeycomb body provided with a plurality of cells. The firing step is the step of firing the formed honeycomb body to obtain the honeycomb structure. Hereinafter, the embodiment will be described in detail. According to the manufacturing method of the honeycomb structure of the present invention, the above-mentioned honeycomb structure of the present invention can suitably be prepared.

Hereinafter, the embodiment of the manufacturing method of the honeycomb structure of the present invention will specifically be described.

3-1. Kneaded Material Preparing Step:

In the kneaded material preparing step of the manufacturing method of the honeycomb structure of the present embodiment, the forming raw materials containing the ceramic raw material and the pore former are mixed and kneaded to obtain the kneaded material. Moreover, in the kneaded material preparing step in the manufacturing method of the honeycomb structure of the present embodiment, the pore former made of a material having expansion/contraction properties is used. In the manufacturing method of the honeycomb structure of the present embodiment, the above-mentioned honeycomb structure can efficiently be prepared by using the pore former having the desired expansion/contraction properties, which are discussed in the following paragraphs.

That is, in the manufacturing method of the honeycomb structure of the present embodiment, by use of the pore former having expansion/contraction properties, it is possible to efficiently prepare the partition walls 5 having a porosity of 45 to 70%, and having a distribution state of the large pores 12 in which "in the cross sections of the surface layer regions of each of the partition walls 5, the total area of the cross sections of the large pores 12 which appear in the cross sections of the surface layer regions is from 60 to 100% of the total area of the cross sections of all the pores 10 which appear in the cross sections of the surface layer regions, and in the cross section of the center region of the partition walls 5 which is parallel to the thickness direction y, the total area of the cross sections of the large pores 12 which appear in the cross section of the center region is from 0 to 40% of the total area of the cross sections of all the pores 10 which appear in the cross section of the center region." (hereinafter referred to as "the distribution state A of the large pores" for convenience of the explanation).

As the pore former which can be used in the manufacturing method of the honeycomb structure of the present embodiment, especially, resin balloons and a water-absorbing polymer are preferable, in the viewpoints that the pore former has excellent expansion/contraction properties and that the partition walls having the distribution state A of the large pores are easily prepared.

In the manufacturing method of the honeycomb structure of the present embodiment, an average particle diameter of the pore former is preferably from 50 to 200 μm. When the average particle diameter of the pore former is from 50 to 200 μm, the sufficient strength of the partition walls of the finally obtained honeycomb structure can be achieved, and an efficiency of filling the catalyst into the pores of the partition walls can be enhanced. Furthermore, in the manufacturing method of the honeycomb structure of the present embodiment, the average particle diameter of the pore former is further preferably from 80 to 170 μm, and especially preferably from 100 to 150 μm.

Furthermore, in the manufacturing method of the honeycomb structure of the present embodiment, the pore former preferably has a plurality of projecting portions on the surface of the pore former, from the viewpoint that the partition walls including the distribution state A of the large pores can more securely be prepared (an example of a mechanism will be described later in which the partition walls including the distribution state A of the large pores are prepared by the pore former having the plurality of projecting portions).

Figure 7:
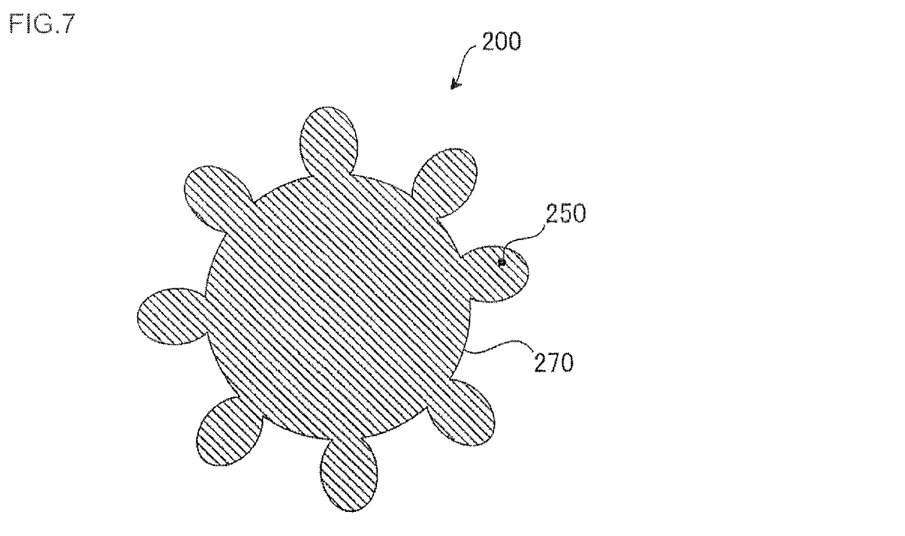
FIG. 7: is a schematic cross sectional view of an example of a pore former which can be used in a manufacturing method of the honeycomb structure of the present invention.

FIG. 7 is a cross sectional view of an example of a pore former 200 having a plurality of projecting portions 250 which can be used in the manufacturing method of the honeycomb structure of the present invention. As the pore former 200 having the plurality of projecting portions 250, a material having the expansion/contraction properties (e.g., the resin balloons or the water-absorbing polymer) and including a plurality of projecting shapes (the projecting portions 250) may be integrally formed, and prepared to be used.

Moreover, as the pore former having the plurality of projecting portions, there may be used a pore former obtained by bonding a pore former (II) having a smaller average particle diameter than a pore former (I) and expansion/contraction properties to the surface of the substantially spherical pore former (I) having expansion/contraction properties. Here, the average particle diameter of the pore former (II) is preferably from 1/40 to 1/7 of the average particle diameter of the pore former (I), from the viewpoint that it is possible to more securely prepare the partition walls including the distribution state A of the large pores.

Furthermore, in the manufacturing method of the honeycomb structure of the present embodiment, when the pore former having the plurality of projecting portions is used and the pore former is made of the pore former (I) and the pore former (II), the average particle diameter of the pore former (II) is preferably from 1/40 to 1/7 of the average particle diameter of the pore former (I), and the pore former is further preferably obtained by bonding five to 20 particles of the pore former (II) to the surface of a single particle of the pore former (I). When the condition of the average particle diameter of the above pore former (II) and the condition of the number of the particles of the pore former (II) which are to be bonded to the surface of the single particle of the pore former (I), it is possible to more securely prepare the partition walls including the distribution state A of the large pores.

Additionally, the average particle diameter of the pore former mentioned in the present description means the average particle diameter classified by sieving (represented by sieve openings for test which are measured by a sieving method).

In the manufacturing method of the honeycomb structure of the present embodiment, the average particle diameter of the pore former is preferably from 50 to 200 µm. When the average particle diameter of the pore former is from 50 to 200 µm, the sufficient strength of the partition walls of the finally obtained honeycomb structure can be achieved, and the efficiency of filling the catalyst into the pores of the partition walls can be enhanced. Furthermore, in the manufacturing method of the honeycomb structure of the present embodiment, the average particle diameter of the pore former is further preferably from 80 to 170 µm, and especially preferably from 100 to 150 µm.

In the manufacturing method of the honeycomb structure of the present embodiment, when the pore former having the plurality of projecting portions is used and the pore former is made of the pore former (I) and the pore former (II), the average particle diameter of the pore former (I) is preferably from 30 to 180 and the average particle diameter of the pore former (II) is preferably from 2 to 20 µm. When the average particle diameters of the pore former (I) and pore former (II) satisfy the above conditions, the sufficient strength of the partition walls of the finally obtained honeycomb structure can be achieved, and the efficiency of filling the catalyst into the pores of the partition walls can be enhanced. Furthermore, in the manufacturing method of the honeycomb structure of the present embodiment, the average particle diameter of the pore former (I) is more preferably from 60 to 150 him, and the average particle diameter of the pore former (II) is more preferably from 2 to 17 µm. Especially, in the manufacturing method of the honeycomb structure of the present embodiment, the average particle diameter of the pore former (I) is most preferably from 80 to 130 and the average particle diameter of the pore former (II) most preferably from 5 to 15 µm.

In the manufacturing method of the honeycomb structure of the present embodiment, a content of the pore former in the forming raw materials is usually from 1 to 10 parts by mass, preferably from 1 to 8 parts by mass, and more preferably from 1 to 6 parts by mass to 100 parts by mass of the ceramic raw material. When an amount of the pore former to be added is smaller than 1 part by mass, the number of the large pores to be formed in the partition walls decreases, and the amount of the catalyst which can be loaded onto the obtained honeycomb structure decreases sometimes. On the other hand, when the amount of the pore former is in excess of 10 parts by mass, the large pores are excessively formed in the partition walls, with the result that the strength of the obtained honeycomb structure deteriorates sometimes.

The ceramic raw material which can be used in the manufacturing method of the honeycomb structure of the present embodiment is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these examples of the ceramic raw material, the cordierite forming raw material is preferable. This is because when the cordierite forming raw material is used, it is possible to obtain the honeycomb structure having a small coefficient of thermal expansion and an excellent resistance to heat shock.

In the manufacturing method of the honeycomb structure of the present embodiment, the forming raw materials may contain a dispersion medium, an additive and the like, in addition to the ceramic raw material and the pore former.

An example of the dispersion medium which can be used in the manufacturing method of the honeycomb structure of the present embodiment is water. Examples of the additive include an organic binder and a surfactant. A content of the dispersion medium is preferably from 30 to 150 parts by mass to 100 parts by mass of the ceramic raw material.

Examples of the organic binder which can be used in the manufacturing method of the honeycomb structure of the present embodiment include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. An content of the organic binder is preferably from 1 to 10 parts by mass to 100 parts by mass of the ceramic raw material.

As the surfactant which can be used in the manufacturing method of the honeycomb structure of the present embodiment, ethylene glycol, dextrin, fatty acid soap, polyalcohol or the like can be used. One of these surfactants may be used alone, or a combination of two or more of the surfactants may be used. A content of the surfactant is preferably from 0.1 to 5.0 parts by mass to 100 parts by mass of the ceramic raw material.

In the manufacturing method of the honeycomb structure of the present embodiment, there is not any special restriction on a method of kneading the forming raw materials to form the kneaded material, but an example of the method is a method using a kneader, a vacuum kneader or the like.

3-2. Forming Step:

In the forming step of the manufacturing method of the honeycomb structure of the present embodiment, the kneaded material obtained in the kneaded material preparing step is extruded into the honeycomb shape to obtain the formed honeycomb body. This formed honeycomb body is provided with the plurality of cells extending through the formed honeycomb body. The extrusion-forming can be performed by using a die having desirable cell shape, partition wall thickness and cell density. As a material of the die, a hard metal which does not easily wear down is preferable.

Next, the forming step of the manufacturing method of the honeycomb structure of the present embodiment will be described in detail with respect to an example where the extrusion-forming is performed by using the pore former 200 shown in FIG. 7.

Figure 8A:
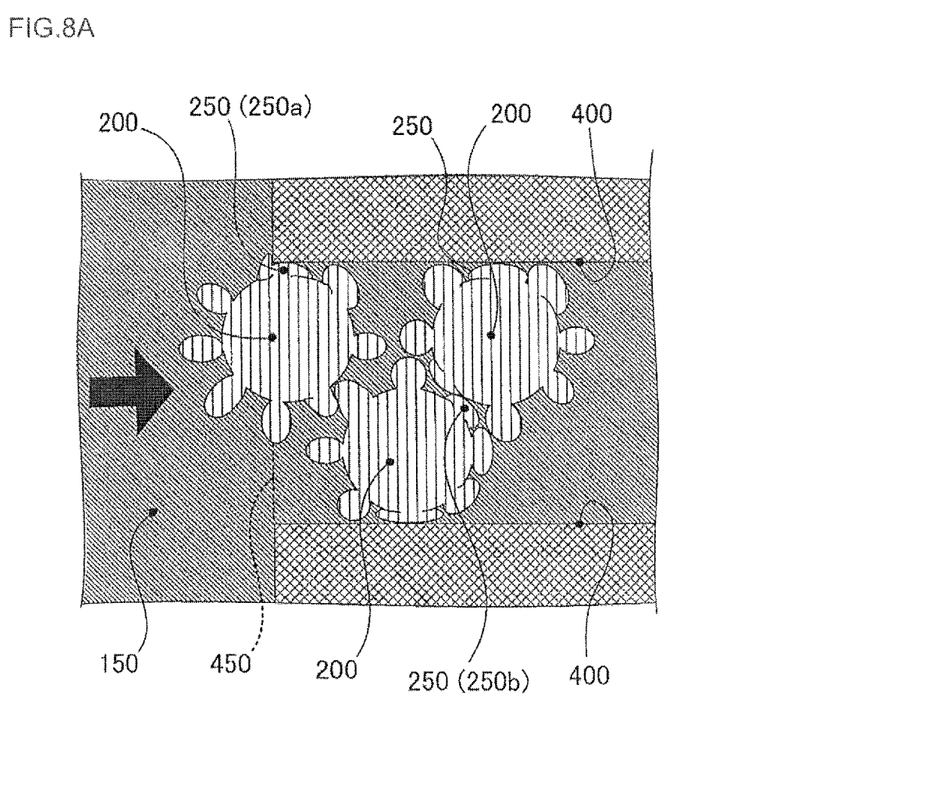
FIG. 8A: is an explanatory view of extrusion-forming performed in an embodiment of the manufacturing method of the honeycomb structure of the present invention.

FIG. 8A is an explanatory view of the extrusion-forming in the manufacturing method of the honeycomb structure of the present embodiment. In the extrusion-forming mentioned here, a die having a thin groove (the slit) cut in a lattice manner is used. A kneaded material 150 which has passed through the slit of this die forms partition walls 170 of the formed honeycomb body (see FIG. 8b).

Furthermore, in the manufacturing method of the honeycomb structure of the present embodiment, as shown in FIG. 7, the pore former 200 made of the material having the expansion/contraction properties and having the plurality of projecting portions 250 is used. According to the pore former 200, when an external force to push the pore former 200 is applied, first, the projecting portions 250 have a tendency to be deformed, thereby contracting.

Therefore, in the manufacturing method of the honeycomb structure of the present embodiment, as shown in FIG. 8A, when the pore former 200 included in the kneaded material 150 is present in the vicinity of a wall surface 400 of the slit of the die in a concentrated manner, the projecting portions 250 of the pore former 200 are mainly pushed and deformed by the wall surface 400 at the inlet 450 of the slit. Consequently, in the manufacturing method of the honeycomb structure of the present embodiment, the position of the pore former 200 (the center position of the pore former 200) is kept in the vicinity of the wall surface 400 of the slit in the concentrated manner. For example, a projecting portion 250a shown in FIG. 8A is pushed and deformed by the wall surface 400 of the slit, and a projecting portion 250b shown in FIG. 8A is pushed and deformed by another adjacent pore former 200. Consequently, in the manufacturing method of the honeycomb structure of the present embodiment, the kneaded material 150 can be inserted into the slit, while the pore former 200 is present in the concentrated manner.

Figure 8B:
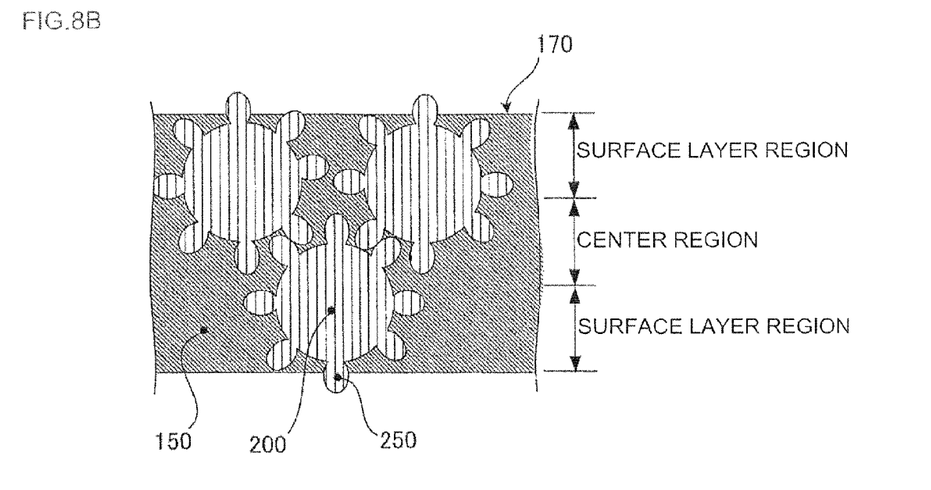
FIG. 8B: is a schematic view of a partition wall of a formed body formed by the extrusion-forming shown in FIG. 8A.

FIG. 8B is a schematic view of a cross section of a partition wall of a formed honeycomb body formed by the extrusion-forming shown in FIG. 8A. When the partition wall 170 of the formed honeycomb body is formed by the configuration shown in FIG. 8A, as shown in FIG. 8B, a large amount of the pore former 200 can be present in a surface layer region of the partition wall 170 in the concentrated manner. This concentration of the pore former 200 is reflected, and also in each partition wall of the finally obtained honeycomb structure, a large number of the large pores are present in the surface layer region of the partition walls 5 as shown in, for example, FIG. 3.

3-3. Firing Step;

In the firing step of the manufacturing method of the honeycomb structure of the present embodiment, the formed honeycomb body obtained in the above forming step is fired, to obtain the honeycomb structure. The honeycomb structure obtained in this way includes porous partition walls with which the plurality of cells are formed to become the through channels of the fluid and in which the plurality of pores are formed.

In the firing step of the manufacturing method of the honeycomb structure of the present embodiment, a firing temperature can suitably be determined in accordance with a material of the formed honeycomb body. When the material of the formed honeycomb body is, for example, cordierite, the firing temperature is preferably from 1380 to 1450° C., and further preferably from 1400 to 1440° C. Moreover, a firing time is preferably from about three to ten hours.

In the manufacturing method of the honeycomb structure of the present embodiment, the formed honeycomb body may be dried before fired. There is not any special restriction on a drying method, but examples of the drying method include hot air drying, microwave drying, dielectric drying, reduced-pressure drying, vacuum drying, and freeze-drying. Among these methods, the dielectric drying, the microwave drying or the hot air drying is preferably performed alone, or a combination of the methods is preferably performed. Moreover, as drying conditions, a drying temperature of 30 to 150° C. and a drying time of one minute to two hours are preferable.

4. Manufacturing Method of Honeycomb Catalyst Body

The honeycomb catalyst body of the present invention can be manufactured, for example, as follows.

First, the honeycomb structure is prepared as a catalyst support. This honeycomb structure can be prepared in accordance with the above-mentioned manufacturing method of the honeycomb structure of the present invention.

First, a catalyst slurry is prepared. An average particle diameter of the catalyst contained in the catalyst slurry is from 0.5 to 5 μm. Furthermore, a viscosity of the catalyst slurry (25° C.) is from 1 to 10 mP·s. When each of the average particle diameter and the viscosity of the catalyst is not less than a lower limit value, it is possible to prevent the catalyst from being excessively filled into the pores, and it is also possible to suppress the increase of the pressure loss in the obtained honeycomb catalyst body. When each of the average particle diameter and the viscosity of the catalyst is not more than an upper limit value, the catalyst can securely be filled into the pores. Therefore, the honeycomb catalyst body having a high exhaust gas purifying performance can easily be obtained.

Next, the catalyst slurry is loaded onto the honeycomb structure. As a method of loading the catalyst slurry onto the honeycomb structure, a heretofore known method such as dipping or suction can be employed. Additionally, after performing the dipping, the suction or the like, an excessive catalyst slurry may be blown off with compressed air.

Next, the honeycomb structure onto which the catalyst slurry has been loaded is dried and fired. In this way, the honeycomb catalyst body can be prepared. Drying conditions can be from 120 to 180° C. and from ten to 30 minutes. Firing conditions can be from 550 to 650° C. and from one to five hours.

EXAMPLES

Hereinafter, the present invention will be described in more detail on the basis of examples, but the present invention is not limited to these examples.

Example 1

Preparation of Pore Former

A pore former (II) made of resin balloons having a smaller average particle diameter than a pore former (I) made of resin balloons was bonded to the pore former (I), to prepare a pore former having a plurality of projecting portions. Specifically, the surface of the pore former (II) was beforehand coated with an adhesive, the pore former was added to a container in which the pore former (I) was contained, and then the pore formers (I) and (II) were mixed, to bond the pore former (II) to the surface of the pore former (I). Additionally, after performing this bonding treatment, the pore former was taken out of the container and observed by using an optical microscope, to confirm that the pore former having the plurality of projecting portions was prepared. An average particle diameter of the pore former (I), an average particle diameter (μm) of the pore former (II) and a value of a ratio of the number of particles of the pore former (II) to the number of particles of the pore former (I) when mixing and bonding the pore former (II) to the pore former (I) [the number of the particles of the pore former (II)/the number of the particles of the pore former (I)] are shown in Table 1.

[Preparation of Honeycomb Structure]

As a cordierite forming raw material, alumina, aluminum hydroxide, kaolin, talc and silica were used. To 100 parts by mass of the cordierite forming raw material, there were added 5 parts by mass of the above-mentioned pore former having the plurality of projecting portions, 85 parts by mass of water (a dispersion medium), 8 parts by mass of water-absorbing hydroxypropyl methylcellulose (an organic binder) and 3 parts by mass of a surfactant. Afterward, the materials were mixed and further kneaded to obtain a kneaded material.

Next, the kneaded material was extruded by using a predetermined die to obtain a formed honeycomb body. In a cross section of the formed honeycomb body which was perpendicular to a cell extending direction, quadrangular cells were formed, and the whole shape was a columnar shape. Then, the obtained formed honeycomb body was dried by a microwave drier. Afterward, the formed honeycomb body was completely dried by a hot air drier. Then, both end surfaces of the dried formed honeycomb body were cut into a predetermined dimension.

The formed honeycomb body obtained in this way was further fired at 1410 to 1440° C. for five hours to obtain a honeycomb structure.

The obtained honeycomb structure had a diameter of 266.7 mm and a length of 152.4 mm in a central axis direction. A thickness of each of partition walls was 165.1 μm, and a cell density was 62.0 cells/cm².

[Preparation of Honeycomb Catalyst Body]

1 kg of water was added to 200 g of β-zeolite having an average particle diameter of 5 μm (copper ion-exchanged zeolite), followed by wet grinding in a ball mill. 20 g of alumina sol was added as a binder to obtained crushed particles to obtain a catalyst slurry. A viscosity of this catalyst slurry was regulated into 5 mPa·s. Then, the honeycomb structure was immersed into this catalyst slurry. Afterward, this honeycomb structure was dried at 120° C. for 20 minutes, and then fired at 600° C. for one hour. A honeycomb catalyst body was obtained in this way. It has been found that an amount of a catalyst to be loaded onto the honeycomb catalyst body is 250 g/liter.

Examples 2 to 14

In Examples 2 to 14, honeycomb structures and honeycomb catalyst bodies were prepared by a method similar to Example 1, except that a pore former having a plurality of projecting portions was prepared with an average particle diameter (μm) of a pore former (I), an average particle diameter (μm) of a pore former (II) and a value of a ratio of the number of particles of the pore former (II) to the number of particles of the pore former (I) when mixing and bonding the pore former (II) to the pore former (I) [the number of the particles of the pore former (II)/the number of the particles of the pore former (I)] shown in Table 1 and that the pore former obtained in this manner was used.

Comparative Examples 1 to 3

In Comparative Examples 1 to 3, honeycomb structures and honeycomb catalyst bodies were prepared by a method similar to Example 1, except that a pore former of substantially spherical carbon powder having an average particle diameter (μm) shown in Table 2 was used.

Examples 15 to 19

In Examples 15 to 19, honeycomb structures and honeycomb catalyst bodies were prepared by a method similar to Example 1, except that a pore former having a plurality of projecting portions was prepared with an average particle diameter (μm) of a pore former (I), an average particle diameter (μm) of a pore former (II) and a value of a ratio of the number of particles of the pore former (II) to the number of particles of the pore former (I) when mixing and bonding the pore former (II) to the pore former (I) [the number of the particles of the pore former (II)/the number of the particles of the pore former (I)] shown in Table 3 and that the pore former obtained in this manner was used. Additionally, in each of Examples 15 to 19, an average pore diameter was 23 μm, a ratio of large pores in each surface layer region was 72%, and a ratio of large pores in a center region was 25%.

Examples 20 to 26

In Examples 20 to 26, honeycomb structures and honeycomb catalyst bodies were prepared by a method similar to Example 1, except that a pore former having a plurality of projecting portions was prepared and used in an average particle diameter (μm) of a pore former (I), an average particle diameter (μm) of a pore former (II) and a value of a ratio of a particle number between the pore former (I) and the pore former (II) when mixing and bonding the pore former (II) to the pore former (I) [the number of the particles of the pore former (II)/the number of the particles of the pore former (I)] shown in Table 3 and that vanadium was used in place of β-zeolite (copper ion-exchanged zeolite) at preparation of a catalyst slurry. Additionally, in each of Examples 20 to 26, an average pore diameter was 23 him, a ratio of large pores in each surface layer region was 72%, and a ratio of large pores in a center region was 25%.

Comparative Examples 4 to 6

Honeycomb structures and honeycomb catalyst bodies were prepared by a method similar to Comparative Example 1, except that substantially spherical carbon powder having an average particle diameter (μm) shown in Table 3 was used as a pore former and that a cell density was set as shown in Table 5. In Comparative Examples 4 to 6, a ratio of large pores in each surface layer region was from 50% to 71%, a ratio of large pores in a center region was from 26% to 42%. Moreover, in Comparative Examples 4 to 6, a porosity (A) was 35% or less (out of a range of 45 to 70%).

TABLE 1

|  | Ave. particle dia. (μm) of pore former (I) | Ave. particle dia. (μm) of pore former (II) | No. of particles of pore former (II)/No. of particles of pore former (I) |
| --- | --- | --- | --- |
| Example 1 | 105 | 15 | 13 |
| Example 2 | 105 | 9 | 11 |
| Example 3 | 110 | 14 | 14 |
| Example 4 | 104 | 8 | 12 |
| Example 5 | 94 | 11 | 10 |
| Example 6 | 93 | 4 | 9 |
| Example 7 | 107 | 3 | 12 |
| Example 8 | 102 | 13 | 13 |
| Example 9 | 104 | 8 | 11 |
| Example 10 | 101 | 7 | 10 |
| Example 11 | 120 | 14 | 8 |
| Example 12 | 125 | 3 | 4 |
| Example 13 | 180 | 20 | 8 |
| Example 14 | 60 | 3 | 12 |

TABLE 2

|  | Ave. particle dia. (μm) of pore former |
| --- | --- |
| Comparative Example 1 | 101 |
| Comparative Example 2 | 110 |
| Comparative Example 3 | 120 |

TABLE 3

| | Ave. particle dia. (μm) of pore former (I) | Ave. particle dia. (μm) of pore former (II) | No. of particles of pore former (II)/No. of particles of pore former (I) |
|---|---|---|---|
| Example 15 | 102 | 9 | 12 |
| Example 16 | 104 | 9 | 11 |
| Example 17 | 104 | 7 | 14 |
| Example 18 | 103 | 9 | 12 |
| Example 19 | 105 | 8 | 14 |
| Example 20 | 104 | 9 | 11 |
| Example 21 | 103 | 7 | 15 |
| Example 22 | 102 | 10 | 10 |
| Example 23 | 101 | 8 | 12 |
| Example 24 | 103 | 8 | 13 |

TABLE 3-continued

| | Ave. particle dia. (μm) of pore former (I) | Ave. particle dia. (μm) of pore former (II) | No. of particles of pore former (II)/No. of particles of pore former (I) |
|---|---|---|---|
| Example 25 | 101 | 9 | 12 |
| Example 26 | 103 | 8 | 13 |
| Comparative Example 4 | 65 | — | — |
| Comparative Example 5 | 61 | — | — |
| Comparative Example 6 | 63 | — | — |

TABLE 4

| | Honeycomb structure | | | | | Honeycomb catalyst body | | | | | | | |
|---|---|---|---|---|---|---|---|---|---|---|---|---|---|
| | | | Ratio of large pores (%) | | | | | Pressure loss | | | | | |
| | Porosity (A) (%) | Ave. pore dia. (μm) | Surface layer region | Center region | Permeability (m$^2$) | NOx purification efficiency (%) | Evaluation | Inflow pressure/outflow pressure | Evaluation | Strength (MPa) | Evaluation | Resistance to heat shock (° C.) | Evaluation |
| Example 1 | 50 | 23 | 72 | 25 | 4 | 74 | A | 1.06 | A | 2.67 | A | 550 | A |
| Example 2 | 49 | 22 | 81 | 12 | 4 | 72 | A | 1.04 | A | 2.56 | A | 650 | A |
| Example 3 | 50 | 20 | 75 | 36 | 3 | 72 | A | 1.08 | A | 3.20 | A | 550 | A |
| Example 4 | 52 | 24 | 87 | 25 | 6 | 73 | A | 1.05 | A | 3.10 | A | 550 | A |
| Example 5 | 51 | 23 | 65 | 26 | 5 | 70 | A | 1.06 | A | 2.50 | A | 600 | A |
| Example 6 | 50 | 22 | 62 | 30 | 7 | 71 | A | 1.06 | A | 3.40 | A | 550 | A |
| Example 7 | 51 | 20 | 70 | 21 | 2 | 72 | A | 1.06 | A | 2.10 | A | 550 | A |
| Example 8 | 52 | 24 | 76 | 16 | 4 | 71 | A | 1.06 | A | 2.50 | A | 600 | A |
| Example 9 | 51 | 21 | 81 | 24 | 3 | 74 | A | 1.06 | A | 3.02 | A | 550 | A |
| Example 10 | 50 | 22 | 86 | 31 | 2 | 72 | A | 1.06 | A | 3.40 | A | 550 | A |
| Example 11 | 48 | 24 | 92 | 32 | 4 | 70 | A | 1.12 | B | 0.91 | B | 600 | A |
| Example 12 | 51 | 22 | 65 | 8 | 4 | 71 | A | 1.16 | B | 2.25 | A | 600 | A |
| Example 13 | 53 | 45 | 90 | 35 | 12 | 72 | A | 0.83 | A | 0.91 | B | 525 | B |
| Example 14 | 50 | 18 | 61 | 5 | 0.8 | 70 | A | 1.19 | B | 1.35 | A | 550 | A |
| Comparative Example 1 | 49 | 22 | 50 | 30 | 5 | 73 | A | 1.21 | C | 2.30 | A | 600 | A |
| Comparative Example 2 | 50 | 22 | 70 | 42 | 5 | 72 | A | 1.10 | A | 0.89 | C | 600 | A |
| Comparative Example 3 | 43 | 23 | 71 | 26 | 4 | 74 | A | 1.23 | C | 3.33 | A | 550 | A |

TABLE 5

| | Honeycomb structure | | | Honeycomb catalyst body | | | | | | | | |
|---|---|---|---|---|---|---|---|---|---|---|---|---|
| | | | | | | | | | Pressure loss | | Catalyst peel | |
| | Porosity (A) (%) | Ave. pore dia. (μm) | Cell density (cells/cm$^2$) | Type of catalyst | Amount of catalyst to be loaded (g/L) | Porosity (B) (%) | Porosity (B)/Porosity (A) | NOx purification ratio (%) | Evaluation | Inflow pressure/outflow pressure | Evaluation | Decrease ratio (%) | Evaluation |
| Example 15 | 50 | 23 | 46.5 | Copper ion-exchanged zeolite | 250 | 10 | 0.20 | 73 | A | 1.04 | A | 2.00 | A |
| Example 16 | 51 | 23 | 46.5 | Copper ion-exchanged zeolite | 250 | 5 | 0.10 | 72 | A | 1.05 | A | 2.10 | A |
| Example 17 | 52 | 23 | 46.5 | Copper ion-exchanged zeolite | 250 | 11 | 0.21 | 74 | A | 1.02 | A | 1.90 | A |

TABLE 5-continued

| | Honeycomb structure | | | | | | Honeycomb catalyst body | | | | | |
|---|---|---|---|---|---|---|---|---|---|---|---|---|
| | Porosity (A) (%) | Ave. pore dia. (μm) | Cell density (cells/cm²) | Type of catalyst | Amount of catalyst to be loaded (g/L) | Porosity (B) (%) | Porosity (B)/ Porosity (A) | NOx purification ratio | | Pressure loss Inflow pressure/ outflow pressure | | Catalyst peel Decrease ratio (%) | |
| | | | | | | | | (%) | Evaluation | | Evaluation | ratio (%) | Evaluation |
| Example 18 | 50 | 23 | 46.5 | Copper ion-exchanged zeolite | 250 | 7 | 0.14 | 71 | A | 1.06 | A | 1.80 | A |
| Example 19 | 49 | 23 | 46.5 | Copper ion-exchanged zeolite | 250 | 16 | 0.33 | 73 | A | 1.07 | A | 1.90 | A |
| Example 20 | 51 | 23 | 46.5 | Vanadium | 250 | 21 | 0.41 | 71 | A | 1.06 | A | 2.00 | A |
| Example 21 | 53 | 23 | 46.5 | Vanadium | 250 | 14 | 0.26 | 72 | A | 1.06 | A | 1.85 | A |
| Example 22 | 50 | 23 | 46.5 | Vanadium | 250 | 16 | 0.32 | 72 | A | 1.05 | A | 1.70 | A |
| Example 23 | 52 | 23 | 46.5 | Vanadium | 250 | 12 | 0.23 | 76 | A | 1.06 | A | 1.60 | A |
| Example 24 | 51 | 23 | 46.5 | Vanadium | 250 | 6 | 0.12 | 72 | A | 1.07 | A | 1.50 | A |
| Example 25 | 49 | 23 | 46.5 | Vanadium | 250 | 31 | 0.63 | 70 | A | 1.18 | B | 3.50 | B |
| Example 26 | 49 | 23 | 46.5 | Vanadium | 250 | 4 | 0.08 | 71 | A | 0.65 | A | 3.60 | B |
| Comparative Example 4 | 35 | 4 | 46.5 | Copper ion-exchanged zeolite | 250 | 30 | 0.86 | 71 | A | 1.12 | B | 6.00 | C |
| Comparative Example 5 | 32 | 5 | 31 | Copper ion-exchanged zeolite | 250 | 29 | 0.91 | 73 | A | 1.12 | B | 6.20 | C |
| Comparative Example 6 | 34 | 4 | 7.75 | Copper ion-exchanged zeolite | 250 | 27 | 0.79 | 73 | A | 1.02 | B | 6.30 | C |

The honeycomb structures of Examples 1 to 26 and Comparative Examples 1 to 6 were subjected to evaluations of [Porosity (A)], [Average Pore Diameter], [Measurement of Ratio of Large Pores] and [Measurement of Permeability] (the results are shown in Table 4 or 5). Evaluation methods of the respective evaluations are as follows. In each evaluation, three evaluation stages were "A", "B" and "C". "A" and "B" passed. It is meant that "A" is more excellent than "B". "C" failed.

[Porosity (A) (%)]:

A porosity (A) (%) in a honeycomb structure was measured by a mercury porosimeter (mercury porosimetry). As the mercury porosimeter, trade name: Auto Pore III type 9405 manufactured by Micromeritics Co, was used.

[Average Pore Diameter (μm)]:

An average pore diameter of partition walls was measured by the mercury porosimeter (the mercury porosimetry).

[Measurement of Ratio of Large Pores]

By a scanning electron microscope (SEM), four arbitrary view fields of cross sections of partition walls of a honeycomb which were perpendicular to a cell extending direction were photographed. A photographing magnification was 100 times. Each view field included vertical 640 pixels×horizontal 480 pixels, in which each pixel=1 The photographed image was binarized by image analysis ("WINROOF" manufactured by MITANI Co.). After the binarization, an area ratio of pores was calculated.

[Measurement of Permeability]

As Darcy's law, the following equation is usually present. $\Delta P/L = 1/k \times \mu \times u$, in which $\Delta P[Pa]$: a pressure loss at air penetration, $L[m]$: a sample thickness, $\mu[Pa \cdot s]$: an air viscosity at 25° C., a viscosity of $18.35^{-6}$ at 1 atm, and $u[m/s]$: a fluid speed. A penetration coefficient $k$ [m²] at this time is defined as the permeability. The permeability was calculated.

The honeycomb catalyst bodies of Examples 1 to 26 and Comparative Examples 1 to 6 were subjected to evaluations of [Porosity (B)], Purification Efficiency], [Pressure Loss], [Resistance to Heat Shock] and [Catalyst Peel] (the results are shown in Table 4 or 5). Evaluation methods of the respective evaluations are as follows. In each evaluation, three evaluation stages were "A", "B" and "C". "A" and "B" passed. It is meant that "A" is more excellent than "B". "C" failed.

[Porosity (B) (%)]:

A porosity (B) (%) in a honeycomb catalyst body was measured by a method similar to that of the above-mentioned porosity (A). Furthermore, a ratio of the porosity (B) to the porosity (A) [the porosity (B)/the porosity (A)] was calculated.

[Purification Efficiency ($NO_x$ Purification Efficiency)]

First, a gas for test including $NO_x$ was allowed to flow through the honeycomb catalyst body. Afterward, an amount of the $NO_x$ of the exhaust gas discharged from this honeycomb catalyst body was analyzed by a gas analysis meter.

Here, a temperature of the gas for test allowed to flow into the honeycomb catalyst body was 200° C. Additionally, temperatures of the honeycomb catalyst body and the gas for test were regulated by a heater. As the heater, an infrared image furnace was used. As the gas for test, there was used a gas obtained by mixing nitrogen with 5 vol % of carbon dioxide, 14 vol % of oxygen, 350 ppm of nitrogen monoxide (in terms of the volume), 350 ppm of ammonia (in terms of the volume) and 10 vol % of water. As this gas for test, the water and a gas mixture obtained by mixing the gases (nitrogen, carbon dioxide, oxygen, nitrogen monoxide, and ammonia) were separately prepared. Moreover, when the test was carried out, the water and the gas mixture were mixed in a piping line to obtain the gas for test. As the gas analysis meter, "MEXA9100EGR manufactured by HORIBA Co." was used. Moreover, a space speed at the flowing of the gas for test into the honeycomb catalyst body was 50000 ($time^{-1}$).

An "$NO_x$ purification ratio" in Table 4 is a value obtained by dividing, by an amount of the $NO_x$ in the gas for test, a value obtained by subtracting the amount of the $NO_x$ in the gas discharged from the honeycomb catalyst body from the amount of the $NO_x$ in the gas for test, and multiplying the obtained value by 100. Here, a case where the $NO_x$ purification ratio was 50% or more was regarded as "A", a case where the ratio was in excess of 30% and smaller than 50% was regarded as "B", and a case where the ratio was 30% or less was regarded as "C".

[Pressure Loss]

On room temperature conditions, air was allowed to flow through the honeycomb catalyst body at a flow speed of 0.5 m³/minute. In this state, a difference between a pressure on an air inflow side and a pressure on an air outflow side was measured. This pressure difference was calculated as a pressure loss. A case where the pressure loss ratio was smaller than 1.15 was regarded as "A", a case where the pressure loss ratio was 1.15 or more and smaller than 1.20 was regarded as "B", and a case where the pressure loss ratio was 1.20 or more was regarded as "C".

[Strength]

A strength of the honeycomb catalyst body was measured. The measurement of the strength was performed on the basis of an isostatic breaking strength test stipulated by a car standard (JASO Standard) M505-87 issued by Society of Automotive Engineers of Japan. In the isostatic breaking strength test, a honeycomb catalyst body is placed in a rubber tubular container, the container is closed with a lid made of an aluminum plate, and isotropic pressurizing compression is carried out in water. That is, the isostatic breaking strength test simulates compressive load applying in a case where an outer peripheral surface of the honeycomb catalyst body is held in a can member of a converter. The isostatic breaking strength is indicated by an applied pressure value (MPa) when the honeycomb catalyst body breaks down. A case where the applied pressure value (MPa) was 2.00 MPa or more was regarded as "A", a case where the applied pressure value was 0.9 MPa or more and smaller than 2.0 MPa was regarded as "B", and a case where the applied pressure value was smaller than 0.9 MPa was regarded as "C".

[Resistance to Heat Shock]

First, the honeycomb catalyst body was conveyed into a furnace at a predetermined temperature, and the honeycomb catalyst body was disposed in the furnace at the same temperature for 60 minutes. After 60 minutes, the honeycomb catalyst body was removed from the furnace, and moved to a position at ordinary temperature, and it was confirmed whether or not cracks were generated in an end surface of the honeycomb catalyst body. A case where the temperature in the furnace where the cracks started to be generated was 550° C. or more was regarded as "A", a case where the temperature was 500° C. or more and lower than 550° C. was regarded as "B", and a case where the temperature was lower than 500° C. was regarded as "C".

[Catalyst Peel Test]

A honeycomb catalyst body was packaged in a sheet metal container, an inlet discharge temperature was 650° C., and an excitation force of 30 G was applied, to perform a durability test for 100 hours. Weights of the honeycomb catalyst body before and after the durability test were measured, and a weight decrease of the honeycomb catalyst body was measured as a catalyst peel amount. A case where the weight decrease of the honeycomb catalyst body was smaller than 3% was regarded as "A", a case where the weight decrease was 3% or more and smaller than 5% was regarded as "B", and a case where the weight decrease was 5% or more was regarded as "C".

In the honeycomb catalyst bodies of Examples 1 to 14, all the evaluations of "$NO_x$ Purification Ratio", "Pressure Loss", "Strength" and "Resistance to Heat Shock" were "A" or "B", i.e., "passed". On the other hand, in the honeycomb catalyst bodies of Comparative Examples 1 to 3, at least one of the above four evaluations was "C" (failed).

In the honeycomb catalyst bodies of Examples 15 to 26, all the evaluations of "$NO_x$ Purification Ratio", "Pressure Loss" and "Catalyst Peel" were "A" or "B", i.e., "passed". On the other hand, in the honeycomb catalyst bodies of Comparative Examples 4 to 6, the evaluation of "Catalyst Peel" was "C" (failed).

INDUSTRIAL APPLICABILITY

The present invention can be utilized as a honeycomb structure onto which a catalyst for purification of an exhaust gas is loaded, a honeycomb catalyst body using this honeycomb structure, and a manufacturing method of a honeycomb structure.

DESCRIPTION OF REFERENCE MARKS

2: (one) end surface, 3: (the other) end surface, 4, 4a and 4b: cell, 5: partition wall, 7: outer peripheral wall, 10 and 10a to 10c: pore, 12, 12a and 12b: large pore, 20: catalyst, 30: open frontal area of the pore (which is closed with the catalyst), 100: honeycomb structure, 150: kneaded material, 170: partition wall made of the kneaded material, 200: pore former, 250, 250a and 250b: projecting portion, 270: surface (of the pore former), 400: wall surface (of a slit of a die), 450: inlet (of the slit), and G and $G_1$ to $G_3$: gas.

The invention claimed is:

1. A honeycomb structure comprising:
porous partition walls with which a plurality of cells are formed to become through channels of a fluid and which are provided with a plurality of pores,
wherein a porosity of the partition walls is from 45 to 70%, and
wherein pores having a maximum width in excess of 10 μm in a cross section of each of the partition walls, which is parallel to a thickness direction of the partition wall, are large pores, wherein the partition wall is equally divided into three regions of a center region and surface layer regions present on both sides of the center region along the thickness direction, in the cross sections of the surface layer regions of the partition wall which are parallel to the thickness direction, a total area of cross sections of the large pores present in the cross sections of the surface layer regions is from 60 to 100% of a total area of cross sections of all the pores present in the cross sections of the surface layer regions, and in the cross section of the center region of the partition wall which is parallel to the thickness direction, a total area of cross sections of the large pores present in the cross section of the center region is from 0 to 40% of the total area of cross sections of all the pores which appear in the cross section of the center region.

2. The honeycomb structure according to claim 1, wherein in the cross section of each of the partition walls which is perpendicular to the thickness direction, a shape of a contour of each of the pores corresponding to 20 to 100% of all the pores is one of a substantially circular shape and a substantially elliptic shape.

3. The honeycomb structure according to claim 1, wherein a permeability is from $1 \times 10^{-12}$ to $10 \times 10^{-12}$ (m²).

4. The honeycomb structure according to claim 1,
wherein a cell density is from 7.75 to 46.5 cells/cm², and
the partition walls have a porosity of 50 to 70% and an average pore diameter of 10 to 50 µm.

5. A honeycomb catalyst body comprising:
the honeycomb structure according to claim 1; and
a catalyst loaded onto the surfaces of the pores of the partition walls of the honeycomb structure.

6. A honeycomb catalyst body comprising:
the honeycomb structure according to claim 2; and
a catalyst loaded onto the surfaces of the pores of the partition walls of the honeycomb structure.

7. A honeycomb catalyst body comprising:
the honeycomb structure according to claim 3; and
a catalyst loaded onto the surfaces of the pores of the partition walls of the honeycomb structure.

8. A honeycomb catalyst body comprising:
the honeycomb structure according to claim 4; and
a catalyst loaded onto the surfaces of the pores of the partition walls of the honeycomb structure.

9. The honeycomb catalyst body according to claim 5,
wherein the catalyst includes at least one of metal-substituted zeolite and vanadium, an amount of the catalyst to be loaded is from 100 to 300 g/L, and
in the partition walls, a ratio of a porosity (B) in a state where the catalyst is loaded to a porosity (A) before the catalyst is loaded is from 0.1 to 0.6.

10. The honeycomb catalyst body according to claim 6,
wherein the catalyst includes at least one of metal-substituted zeolite and vanadium, an amount of the catalyst to be loaded is from 100 to 300 g/L, and
in the partition walls, a ratio of a porosity (B) in a state where the catalyst is loaded to a porosity (A) before the catalyst is loaded is from 0.1 to 0.6.

11. The honeycomb catalyst body according to claim 7,
wherein the catalyst includes at least one of metal-substituted zeolite and vanadium, an amount of the catalyst to be loaded is from 100 to 300 g/L, and
in the partition walls, a ratio of a porosity (B) in a state where the catalyst is loaded to a porosity (A) before the catalyst is loaded is from 0.1 to 0.6.

12. The honeycomb catalyst body according to claim 8,
wherein the catalyst includes at least one of metal-substituted zeolite and vanadium, an amount of the catalyst to be loaded is from 100 to 300 g/L, and
in the partition walls, a ratio of a porosity (B) in a state where the catalyst is loaded to a porosity (A) before the catalyst is loaded is from 0.1 to 0.6.

13. A manufacturing method of a honeycomb structure which obtains the honeycomb structure according to claim 1, comprising:
a kneaded material preparing step of mixing and kneading forming raw materials containing a ceramic raw material and a pore former having expansion/contraction properties to obtain a kneaded material;
a forming step of extruding the kneaded material to obtain a formed honeycomb body having partition walls with which a plurality of cells are formed; and
a firing step of firing the formed honeycomb body to obtain the honeycomb structure.

14. The manufacturing method of the honeycomb structure according to claim 13,
wherein the pore former has a plurality of projecting portions on the surface of the pore former.

\* \* \* \* \*